US011785196B2

(12) United States Patent
Boyle

(10) Patent No.: US 11,785,196 B2
(45) Date of Patent: Oct. 10, 2023

(54) ENHANCED THREE DIMENSIONAL VISUALIZATION USING ARTIFICIAL INTELLIGENCE

(71) Applicant: Johnson Controls Tyco IP Holdings LLP, Milwaukee, WI (US)

(72) Inventor: Stuart Boyle, Belfast (GB)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/487,985

(22) Filed: Sep. 28, 2021

(65) Prior Publication Data

US 2023/0102949 A1    Mar. 30, 2023

(51) Int. Cl.

| | |
|---|---|
| *H04N 13/111* | (2018.01) |
| *G06T 7/593* | (2017.01) |
| *G06T 7/70* | (2017.01) |
| *H04N 13/122* | (2018.01) |
| *G06V 20/64* | (2022.01) |
| *G06V 40/16* | (2022.01) |

(Continued)

(52) U.S. Cl.
CPC ............ *H04N 13/111* (2018.05); *G06T 7/593* (2017.01); *G06T 7/70* (2017.01); *G06T 17/20* (2013.01); *G06V 20/41* (2022.01); *G06V 20/64* (2022.01); *G06V 40/173* (2022.01); *H04N 13/122* (2018.05); *G06T 2207/20081* (2013.01); *G06V 20/44* (2022.01); *H04N 2013/0081* (2013.01); *H04N 2213/002* (2013.01)

(58) Field of Classification Search
CPC .... B25J 11/0085; B25J 13/087; B25J 9/1664; G05D 1/0016; G05D 1/0022; G05D 1/0044; G05D 1/0219; G05D 1/024; G05D 1/0272; G05D 1/0274; G05D 2201/0215; G05D 1/0248; G05D 1/0027; G05D 2201/0203; G06F 9/5016; G06F 9/5038; G06F 2209/509; G06F 9/5066; G06N 3/084; G06N 10/20; G06N 3/006; G06N 3/0445; G06N 3/0454; G06N 3/0472; G06N 3/0481; G06N 3/082; G06N 3/088; G06N 5/003; G06N 7/005
See application file for complete search history.

(56) References Cited

U.S. PATENT DOCUMENTS

| | | | |
|---|---|---|---|
| 10,602,126 B2 | 3/2020 | Rowell et al. | |
| 2015/0023557 A1* | 1/2015 | Yoo | G06V 40/20 382/103 |

(Continued)

FOREIGN PATENT DOCUMENTS

CN     113435236 A  *  9/2021

OTHER PUBLICATIONS

International Search Report and Written Opinion in PCT/IB2022/058943, dated Jan. 3, 2023, 15 pages.

*Primary Examiner* — Ming Wu
(74) *Attorney, Agent, or Firm* — ARENTFOX SCHIFF LLP

(57) ABSTRACT

Apparatus and methods for enhanced 3D visualization includes receiving a plurality of images of an image scene from a plurality of image sensors. Depth information at locations of the image scene is received from a plurality of depth sensors. The depth information is combined with the plurality of images of the image scene using a machine learning model. A 3D representation of the image scene is generated based on the combined depth and image information.

20 Claims, 5 Drawing Sheets

(51) Int. Cl.
    *G06V 20/40*    (2022.01)
    *G06T 17/20*    (2006.01)
    *H04N 13/00*    (2018.01)

(56) References Cited

U.S. PATENT DOCUMENTS

| | | |
|---|---|---|
| 2019/0197667 A1 | 6/2019 | Paluri |
| 2019/0285881 A1 | 9/2019 | Ilic et al. |
| 2021/0142497 A1 | 5/2021 | Pugh et al. |
| 2022/0026920 A1* | 1/2022 | Ebrahimi Afrouzi .. G06N 3/045 |
| 2022/0027602 A1* | 1/2022 | Zhou ........................ G06N 3/08 |

\* cited by examiner

ENHANCED THREE DIMENSIONAL VISUALIZATION USING ARTIFICIAL INTELLIGENCE

TECHNICAL FIELD

The present disclosure generally relates to a system which combines one or more sensors configured to capture two-dimensional and/or three dimensional image data of one or more objects, and more specifically, to enhanced three dimensional (3D) visualization of the one or more objects using Artificial Intelligence (AI).

BACKGROUND

Conventional approaches for monitoring areas of an environment, such as building entrances, parking structures, and the like, employ image sensors installed at multiple locations. For example, outdoor parking lots may be monitored with surveillance image sensors installed at higher elevations, such as 20 or more feet above the ground. Installing surveillance image sensors at higher elevations allows larger fields of view due to wider viewing angles and longer viewing distances, and greater per-image sensor coverage of vehicles and people on the ground. However, due to the viewing angle and occluding elements such as pillars, ordinary surveillance image sensors in areas such as indoor parking garages may be able to view only a few vehicles or other objects at a time. Moreover, indoor structures typically do not provide the same amount of elevation to allow broader fields of view. For example, multi-story parking garages have ceilings that are often only about 8-9 feet above the floor.

To monitor the areas, image sensor data may be recorded, with a live feed being simultaneously displayed to a monitoring guard or attendant. A single monitoring agent (e.g., security guard) or relatively small team of monitoring agents may be responsible for monitoring multiple image sensor feeds at once. However, it is difficult to constantly monitor each of the image sensors simultaneously for large areas and/or for several image sensor feeds. As a result, the effectiveness of conventional approaches to monitoring areas is generally limited to ex post facto review of past events. To monitor activity in real-time, effective monitoring may generally be limited to specific deployments having only a small number of feeds suitable for small or narrows areas, or highly critical posts with a low ratio of attendants per image sensor display. Furthermore, to react to risks or security concerns effectively, monitoring agents may need real-time monitoring tools to quickly detect and identify different kinds of anomalies within the areas, such as vehicles going in the wrong direction, exceeding speed limits, stalled or abandoned in an aisle, etc.

Presently, the video experience of reviewing a live feed is very static and does not allow for the ability to easily look around objects of interest. Furthermore, continuous viewing of static video feed for a prolonged period of time can lead to operator fatigue.

In view of the foregoing, there is a need for a more dynamic approach to presenting video surveillance data.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure relates to a video processing system that can extract a 3D model of an object using multiple active sensing devices. In some cases, machine learning algorithms can be used to supplement missing visual data.

One example implementation relates to a method for enhanced 3D visualization. One aspect of the method includes receiving a plurality of images of an image scene from a plurality of image sensors. Depth information at locations of the image scene is received from a plurality of depth sensors. The depth information is combined with the plurality of images of the image scene using a machine learning model. A 3D representation of the image scene is generated based on the combined depth and image information.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Active sensing can be used to determine three dimensional models. In order to extract a 3D model of an object or a scene, multiple active sensing devices can be used. Some aspects of a depth sensing system (also referred to as depth sensors) use an infra-red (IR) transmitter to project an invisible IR structured light pattern into the environment and onto an object. The IR radiation reflected from the object is detected by an IR sensor or camera of the depth sensing system. Objects within the environment cause distortions in the structured light pattern as seen by the depth sensor, which is off-axis compared to the light source and these distortions can be used to resolve depth information about the scene.

Intelligent video analysis systems have many applications. In real-time applications, such a system can be used to detect a person in a restricted or hazardous area, report the theft of an item, indicate the presence of a potential assailant in a parking lot, warn about liquid spillage in an aisle, locate a child separated from his or her parents, or determine if a shopper is making a fraudulent return. In forensic applications, an intelligent video analysis system can be used to search for people or events of interest or whose behavior meets certain characteristics, collect statistics about people under surveillance, detect non-compliance with corporate policies in retail establishments, retrieve images of criminals' faces, assemble a chain of evidence for prosecuting a shoplifter, or collect information about individuals' shopping habits. One important tool for accomplishing these tasks is the ability to follow a person as the person traverses a surveillance area and to create a complete record of the surveillance.

Figure 1:
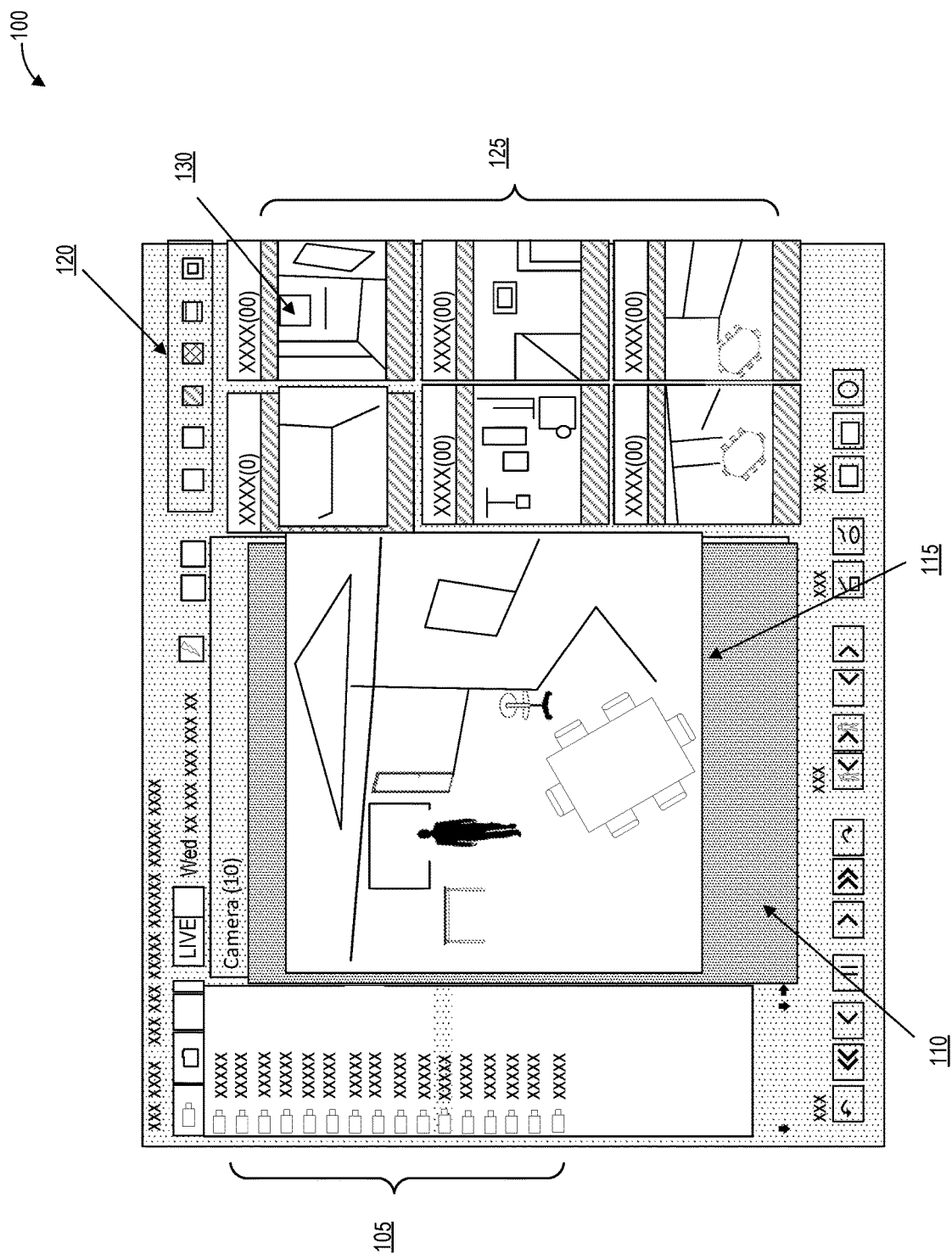
FIG. 1 is an example of a screen capture of a user interface for capturing video surveillance data according to one aspect of the present disclosure.

Referring to FIG. 1 and in accordance with one aspect of the present disclosure, an application screen 100 includes a listing 105 of image sensor locations, each element of the list 105 relating to a camera (referred to hereinafter as "image sensor") that generates an associated video data feed. In FIG. 1, "XXXXX" represent actual image sensor locations. The image sensor locations can be identified, for example, by number (image sensor #2), location (reception, GPS coordinates), subject (jewelry), or a combination thereof. In some aspect, the listing 105 can also include sensor devices other than image sensors, such as depth sensors, motion detectors, heat detectors, door sensors, point-of-sale terminals, radio frequency identification (RFID) sensors, proximity card sensors, biometric sensors, and the like. The screen 100 also includes a primary image sensor pane 110 for displaying a primary video data feed 115, which can be selected from one of the listed image sensor locations 105. The primary video data feed 115 displays video information of interest to a user at a particular time. In some cases, the primary data feed 115 can represent a live data feed (i.e., the user is viewing activities as they occur in real time or near-real time), whereas in other cases the primary data feed 115 represents previously recorded activities. The user can select the primary video data feed 115 from the list 105. For example, by choosing an image sensor number, by noticing a person or event of interest and selecting the person using a pointer or other such input apparatus, or by selecting a location (e.g., "Entrance") in the surveillance region. In some aspects, the primary video data feed 115 is selected automatically based on data received from one or more sensor devices, for example, by detecting activity on a particular image sensor, evaluating rule-based selection heuristics, changing the primary video data feed according to a pre-defined schedule (e.g., in a particular order or at random), determining that an alert condition exists, and/or according to arbitrary programmable criteria.

The application screen 100 also includes a set of layout icons 120 that allow the user to select a number of secondary data feeds to view, as well as their positional layouts on the screen. For example, the selection of an icon indicating six adjacency screens instructs the system to configure a proximate image sensor area 125 with six adjacent video panes 130 that display video data feeds from image sensors identified as "adjacent to" the image sensor whose video data feed appears in the primary image sensor pane 110. It should be noted that even though FIG. 1 shows a plurality of panes having the same shape, each pane (both primary 110 and adjacent 130) can be different sizes and shapes, in some cases depending on the information being displayed. Each pane 110, 130 can show video from any source (e.g., depth, visible light, infrared, thermal), with possibly different frame rates, encodings, resolutions, or playback speeds. The system can also overlay information on top of the video panes 110, 130, such as a date/time indicator, image sensor identifier, image sensor location, visual analysis results, object indicators (e.g., price, SKU number, product name), alert messages, and/or geographic information systems (GIS) data.

The video data feed from an individual adjacent image sensor can be placed within a video pane 130 of the proximate image sensor area 125 according to one or more rules governing both the selection and placement of video data feeds within the proximate image sensor area 125. For example, where a total of 18 image sensors are used for surveillance, but only six data feeds (in this non-limiting example) can be shown in the proximate image sensor area 125, each of the 18 image sensors can be ranked based on the likelihood that a subject being followed through the video will transition from the view of the primary image sensor to the view of each of the other seventeen image sensors. The image sensors with the six (or other number depending on the selected screen layout) highest likelihoods of transition are identified, and the video data feeds from each of the identified image sensors are placed in the available video data panes 130 within the proximate image sensor area 125.

Figure 2:
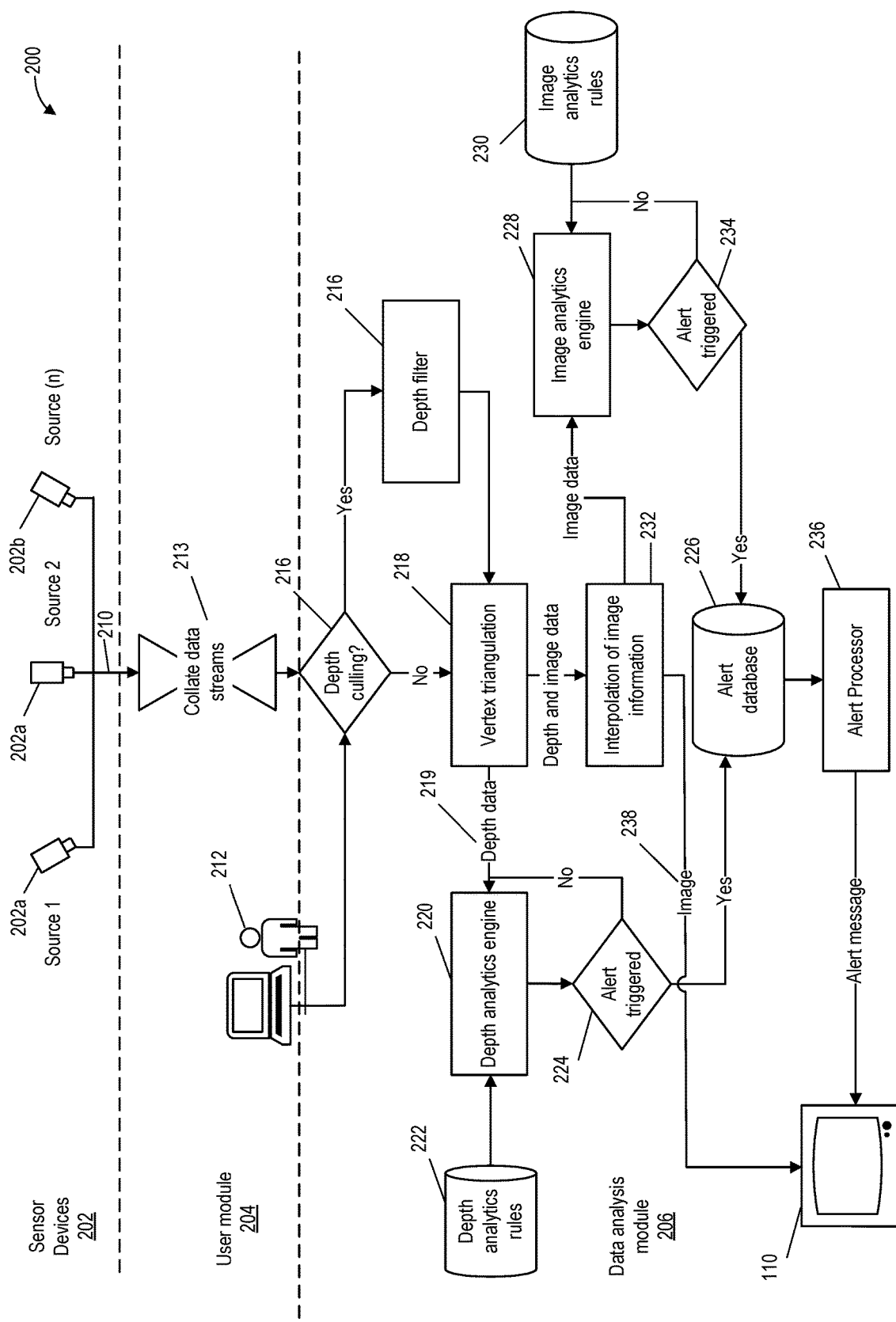
FIG. 2 illustrates one exemplary set of interactions among sensor devices that monitor an environment, a user module for receiving, recording and annotating data received from the sensor devices, and a data analysis module according to one aspect of the present disclosure.

FIG. 2 illustrates one exemplary set of interactions among sensor devices that monitor an environment, a user module for receiving, recording and annotating data received from the sensor devices, and a data analysis module using the techniques described above. The sensor devices 202 (such as image sensors 202a and depth sensors 202b) capture data (such as, video in the case of surveillance image sensors 202a and depth information about the scene in the case of depth sensors 202b). In one aspect, depth information can include a depth map. In other words, one or more depth sensors 202b can be configured to generate a depth map, i.e., an array of 3D coordinates, comprising a depth (Z) coordinate value of the objects in the scene at each point (X,Y) within a predefined area. (In the context of an array of image-related data, these (X,Y,Z) points are also referred to as voxels.)

At step 210, the sensors 202a-b transmit the data (image data and depth information) to the user module 204. The user 212 (or, in cases where automated selection is enabled, the user module 204) selects to combine image data with depth information (step 213). It should be understood, that entire image data stream can be collated with depth information. While monitoring the primary video pane 110, the user 212 identifies an object of interest in the video and can track the object as it passes through the field-of-view of image sensors 202a. The user 212 then requests a viewpoint and optional depth when looking at the object of interest. In some aspects, the user module 204 can receive the depth information prior to the selection of a video feed for the primary video pane 110.

Based on the received image data, depth information and selected object of interest, the data analysis module 206 determines if depth culling needs to be performed. With respect to graphics, culling refers to the process of removing work that does not alter the final image. This includes, for example, view frustum culling, where objects that are outside the view frustum are not further processed, since they will not affect the final image.

In response to determining that depth culling needs to be performed (step 214, "yes" branch), the data analysis module 206 can selectively send image data to a depth filter component 216. In an example aspect, the data analysis module 206 can use a two-dimensional (2D) red-green-blue (RGB) image (i.e., captured from a pixel array, such as pixel array having red, blue and green pixels) and an associated depth map (for example, generated by a depth sensor 202b) to generate a three dimensional (3D) stereo image. The depth map can be used for analysis of image data and for controlling depth-based applications, such as depth-based blur (or artificial bokeh). A depth-based blur can be determined (for example, by depth analytics engine 220) using the depth map, to control the appearance of the depth of field. By controlling the appearance of the depth of field, the generated 3D image can be blurred according to the depth, creating a bokeh-like effect. Depth analytics engine 220 can use filters (e.g., adaptive trilateral filters) to incorporate depth information for depth-based blurring of the generated 3D image outside of the focal area. The depth filter component 216 of the filter can be controlled by the depth information and can be adaptive to each voxel of the image data. For example, a Gaussian function can be used for the depth filter component 216.

In an aspect, in response to determining that depth culling is not needed (step 214, "No" branch) or after receiving filtered image data from the depth filter 216, the data analysis module 206 performs vertex triangulation at 218. To render vector graphics on raster-based imaging devices, the geometric objects are typically converted to raster graphics data in a process called rasterization. Prior to final rasterization, surfaces defined by the geometric objects can be covered with polygons (e.g., triangles or quadrilaterals) in a process called tessellation or triangulation. The polygons can also be referred to as tessellae, and the arrangement of polygons can be referred to as a triangulation or a mesh. Each polygon is defined by at least three vertices, and each vertex can be characterized by color and alpha values. Because tessellation of a shaded surface can produce many polygons, a surface can be rendered with fine variations in the color and alpha values.

In tessellating a two-dimensional geometric object that includes a curved path, the curve can be approximated by a series of line segments. The polygon can then be tessellated using conventional polygon triangulation techniques such as Siedel, Watson, Delaunay, etc., to produce a set of triangles. The approximation of the curve can be referred to as "flattening." The resulting polygon typically has a large number of vertices in the area approximating the curve. However, the number of line segments and the corresponding number of vertices used in approximating the curve can be dependent upon the resolution of the target output device (e.g., a display device).

At 219, the data analysis module 206 sends depth information to the depth analytics engine 220. In an aspect, the depth analytics engine 220 can be configured to generate an estimated depth associated with a voxel based on a reference image and other related images. In an aspect, depth maps can identify depth discontinuities. Current depth maps from an image, or a plurality of related images (e.g., video, etc.), can be used to construct one or more depth estimate signatures for the image itself or objects within the image. A depth estimate signature can be derived by collecting depth values for regions in the image, for example, into a vector, an Ntuple, or other multi-valued structures. Further, each known object can have a depth estimate signature, which can be stored in a database of depth analytics rules 222. In some aspects, the dynamic depth estimate signature can be based on one or more rules, which in some cases can evolve over time based on external factors such as time of day, scene activity and historical observations. The rules can be stored in the database of depth analytics rules 222. For example, the depth analytics engine 220 can use the generated depth estimate signature of an object and one or more rules stored in the database of depth analytics rules 222 to filter out movement within certain predefined depth parameters.

In an aspect, at 224, the data analysis module 206 uses information provided by the depth analysis engine 220 (such as, object's depth estimate signature) to determine if an alert/notification should be triggered. In response to determining that an alert should not be triggered (step 224, "No" branch), the data analysis module 206 can return back to step 220. One exemplary event not leading to an alert being triggered is when object's depth estimate signature and object's movement indicate that the detected object can be a nocturnal animal. In response to determining that an alert should be triggered (step 224, "Yes" branch), the data analysis module 206 can generate an alert and send it to an alert database 226. One exemplary event triggering an alert is when object's depth estimate signature and object's movement indicate that an unidentified vehicle has been detected on the road of interest.

In some instances, the alert database 226 can store contextual data, a subset of the streaming image and/or depth data, derivative data, etc. that may or may not be associated with an alert and/or a user-defined rule. In this way, the data analysis module 206 can use the alert database 226 to identify patterns, trends, statistics and/or the like on streaming data that did not necessarily generate an alert. In some aspects, the alert database 226 can be used in conjunction with the depth analytics rules database 222 and/or the image analytics rules database 230 to define complex rules, such as rules associated with time-averaged data and/or other time-correlated rules.

Various aspects described below include methods of viewpoint interpolation that can be used to generate artificially rendered frames. In various examples, interpolation between frames is performed along a path between the frames. In some instances, this path can follow a non-linear trajectory. By providing interpolation methods for paths between or beyond the originally provided frames, various artificially rendered views can be provided for a rendered 3D view of the object of interest.

Typically, interpolation can be implemented using a variety of well-known methods. For instance, interpolating the pixel locations can include interpolation using barycentric coordinates based on three or more control points. In some examples, interpolating the pixel locations includes interpolation using splines. Some known pixel location interpolation methods include interpolation using finite elements. In yet other methods, interpolating the pixel locations includes using motion of a nearest control point. In addition, interpolating pixel locations using the individual control points includes using dense optical flow in some applications. Although particular examples of interpolation methods are described, none of the conventional methods utilize depth information in conjunction with image data.

Advantageously, at step 232, the data analysis module 206 combines depth data and image data provided by the vertex triangulation (step 218) to perform the aforementioned data interpolation.

Aspects of the present disclosure describe one method of interpolation of a viewpoint outside the trajectory between two frames. For instance, one way to interpolate viewpoints for locations outside of the trajectory between two frames can include moving the layers and/or control points perpendicular to the trajectory direction based on their depth. Specifically, layers/control points at greater depth are moved less than layers/control points at lesser depth. Depending on the characteristics of the frames, different methods can be chosen to provide an appropriate result.

Accordingly, the present disclosure provides techniques to improve object of interest detection, for example, by combining object depth estimates with corresponding source image data. To facilitate improving interpolation of image information (step 232), in some aspect, a machine learning model can be implemented to leverage machine learning techniques, such as convolutional neural network (CNN) techniques. When enabled, the machine learning model can analyze input image data (e.g., source image data, reconstructed image data, decoded image data, and/or encoded image data) and corresponding depth data to determine expected moving pattern and/or determine exact position of the object of interest with greater accuracy. For example, the machine learning model can detect motion activities within a predefined depth range of the image scene.

To facilitate enhanced interpolation of an image, the data analysis module 206 can be trained to determine machine learning parameters. For example, when the data analysis module 206 implements convolutional neural network (CNN) techniques, the machine learning parameters can indicate number of convolution layers, inter-connections between layers, and/or weights (e.g., coefficients) corresponding to each convolution layer. After training, the data analysis module 206 can provide content analysis used to adaptively adjust interpolation parameters.

In one aspect, results of image interpolation (including machine learning interpolation) can be used to generate and render a 3D image of the image scene as described below.

In an aspect, the data analysis module 206 performs analytics on the interpolated image data using the image analytics engine 228 that references the image analytics rules database 230, and the analytics include voxel scanning, and shape/pattern recognition analytics to analyze and search the captured image data for the presence of images matching the designated content based on corresponding depth information. The analytics software can also analyze a scene, tracking identified objects of interest. The shape/pattern detection analytics can also be used to detect objects already in or coming into the scene, such as a person walking or running, and also to detect the direction of travel of such objects. The shape/pattern detection analytics can also be used to detect objects or people approaching the image sensor 202*a* based on changes in the detected measured distance between the image sensor 202*a* and person/object, and based on this analysis, the data analysis module 206 can send an alert. Additional features that can be provided by the image analytics engine 228 can include automatically marking image data if a crash was detected in the background of the scene, such as a vehicle rolling or flipping. Yet another aspect of the shape/pattern detection features provided by the image analytics engine 228 is the determination of a weapon threat. The scene can be scanned for the detection of objects such as potential weapon types like guns, knives, etc., being held in a person's hand or for various threatening stances.

In some aspects, the image analytics engine 228 can determine a confidence level or criterion for the detected object(s), which can be based on a deep learning algorithm. The image analytics engine 228 can include software providing a deep learning analytics engine. Defined shapes and movement rules, multiple images of vehicle types, make, model, etc., can be input and stored in the deep learning engine at different viewing angles, distances, various lighting conditions, etc. The captured image data can be compared against the engine contents based on the image analytics rules 230 to provide a data output with a percentage of confidence of accuracy for its object detection to trigger an alert as described herein. The rules stored in the image analytics rules database 230 can be applied to any object (e.g., pedestrians, animals, street signs, etc.).

In an aspect, at 234, the data analysis module 206 uses information provided by the image analysis engine 228 (such as, confidence level or criterion for the detected object(s)) to determine if an alert/notification should be triggered. In response to determining that an alert should not be triggered (step 234, "No" branch), the data analysis module 206 can return back to step 228. In response to determining that an alert should be triggered (step 234, "Yes" branch), the data analysis module 206 can generate an alert and send it to the alert database 226. In an aspect, a baggage alert can be triggered when someone leaves a bag unattended. The alert database 226 can hold records for different locations containing geographical coordinates and an associated risk level. The risk levels can also vary according to time. One example record stored in the alert database 226 could be for an office where the risk is low during the day but high if any items are left unattended. In various aspects different alerts can be triggered based on different monitoring modes, zones and areas with different risks. For example, a face recognition alert can be triggered for unrecognized person. Once the data analysis module 206 has determined that multiple potential entrants are in the vicinity of the controlled access point and one of them is not authorized, or if a face of one person is not visible to an image sensor 202*a* that might be configured to perform facial recognition module, a face recognition alert can be triggered by the data analysis module 206.

In one aspect, various alerts can be generated by an alert processor 236 based on the information stored in the alert database 226. For example, the alert processor 236 can generate the baggage alert by automatically rendering a 3D visualization of the detected unattended item. Similarly, the alert processor 236 can generate the face recognition alert by automatically rendering a 3D visualization of the unrecognized face. In an aspect, the data analysis module 206 can remove background scene prior to generating the alert. In one aspect, the alert processor 236 can render the 3D image in the primary video pane 110. In one optional aspect, the rendered image can rotate automatically enabling the user 212 to quickly dismiss or flag the detected event.

In an aspect, at step 238, after interpolation of combined depth data and image data, the data analysis module 206 can generate a 3D image of the object of interest and render it in the primary video pane 110, for example, as the object travels through the monitored area. In some cases, the user 212 can send commands to the image sensors 202*a* to change one or more data capture parameters such as image sensor angle, focus, frame rate, etc.

Figures 3A, 3B, 3C:
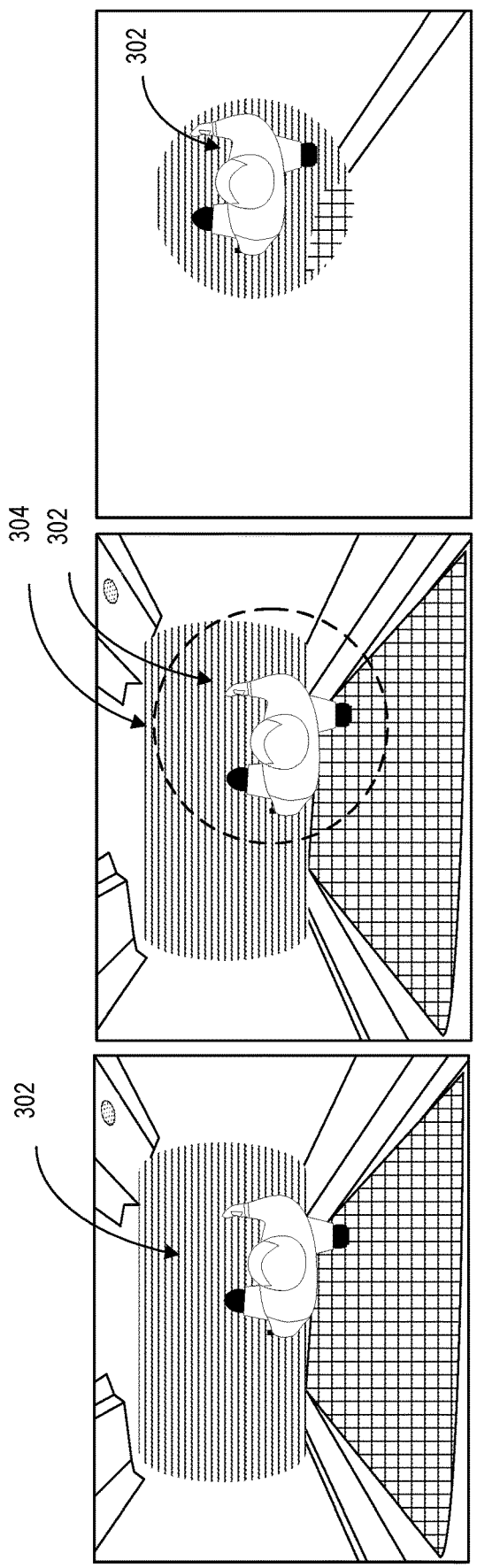
FIGS. 3A-3C are an example of isolation of a region of an image based on depth information according to one aspect of the present disclosure.

Referring to FIGS. 3A-3C, an example of isolation of a region of an image based on depth information is shown according to one aspect of the present disclosure. FIG. 3A shows a top view of an object of interest 302. FIG. 3B shows isolation of the object of interest 302 from the background scene. FIG. 3C illustrates foreground object segmentation. As described above, the original two-dimensional image can be shown in three-dimensions by adjusting parameters of one or more depth sensors 202b and by applying depth information to one or more frames from an image sequence. Adjusting the depth parameters enables a user to highlight an object of interest 302 in the scene. In an aspect, a method of rendering a 3D object of interest can include foreground object segmentation. Referring to FIG. 3C, object segmentation can be done by discriminating foreground pixels from background pixels. In an aspect, the object of interest 302 can be assumed to be included entirely within circle 304. It can also be assumed that circle 304 also includes background pixels. Despite possibly having some background pixels in the circle 304, the data analysis module 206 can initially label all pixels in circle 304 as foreground. In other words, foreground object segmentation can be used by the data analysis module 206 to isolate an object/person of interest from the background scene.

In one aspect, to accomplish the foreground object segmentation, a person can be asked to step inside a marked area for a 3D scan before entering a secure building, for example. The 3D scan can be performed using one or more depth sensors 202b.

Given a 3D scan of an object as viewed from one or more directions, the collected depth information provides a unique shape characterization of the object. These parameters serve as the key for matching. The ideal shape descriptor or collection of parameters should be compact (for fast search) and exhibit invariance to all other deformations beyond shape and/or size. For the human body shape, it is particularly important to deal with the variations due to pose changes. In one aspect, the data analysis module 206 can generate a parametrized deformable mesh (PDM) model of the human body, which can decouple the human pose and shape perturbations and can model them separately. Therefore, the shape model can factorize the deformations caused by changes in intrinsic shape (height, size, belly thickness, etc.) from deformations caused by changes in pose (rigid transformations of body parts). The collected depth information providing the unique shape characterization of the object of interest can be used for further analytics. For example, the data analysis module 206 can track the same person through a building based on the collected depth information. Furthermore, the collected depth information enables the data analysis module 206 to isolate the object/person of interest 302 from the background scene, as shown in FIG. 3C. In an aspect, the 3D image of the object of interest generated by the data analysis module 206 can be rotated in 3D around an origin in real-time using the combination of visual data and depth information provided by one or more image sensors 202a and one or more depth sensors 202b.

Figure 4:
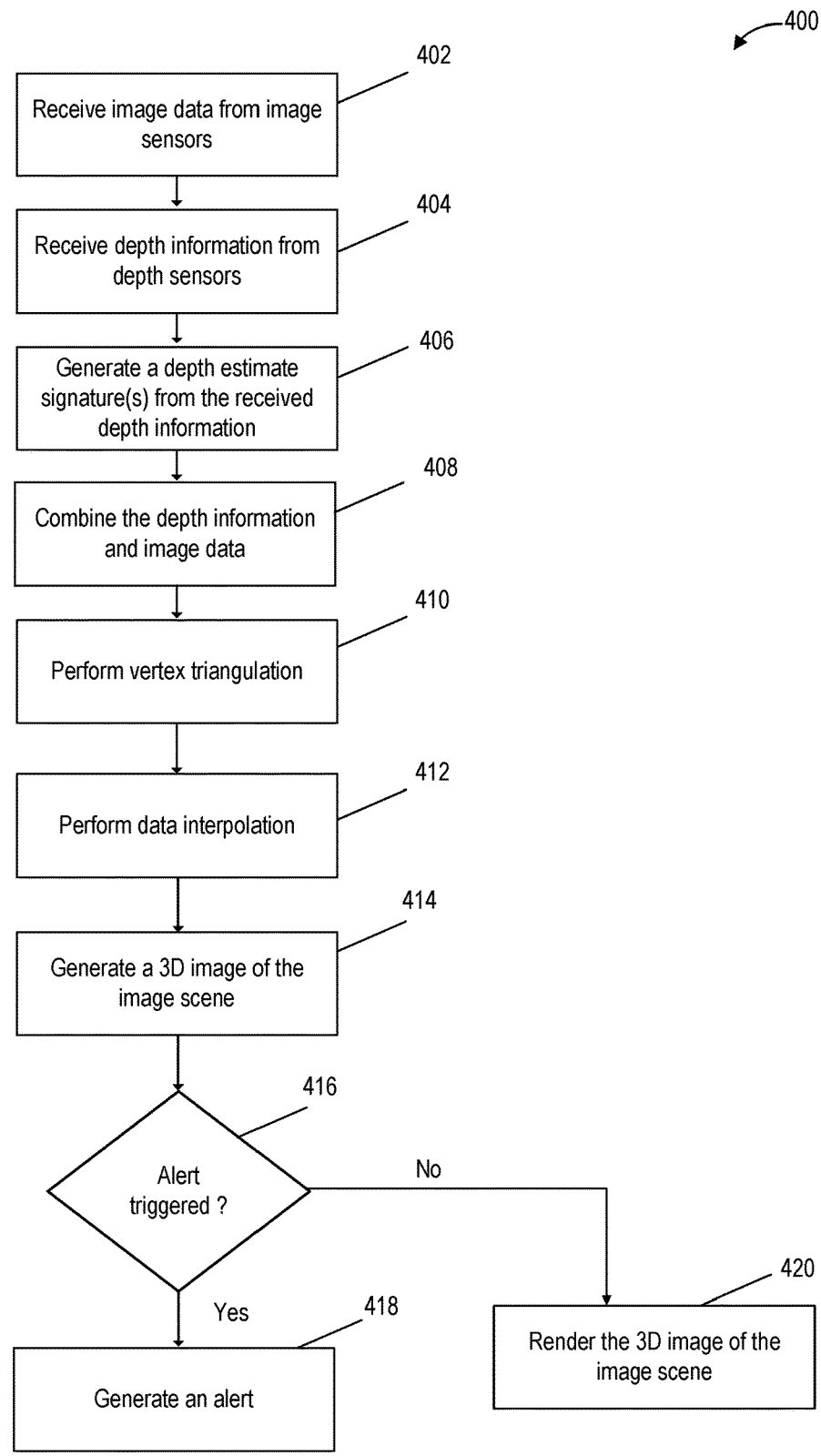
FIG. 4 is an example of a flow diagram of a method for enhanced 3D visualization according to an aspect of the present disclosure.

FIG. 4 is an example of a flow diagram of a method for enhanced 3D visualization according to an aspect of the present disclosure. FIGS. 1-3 may be referenced in combination with the flowchart of FIG. 4. To start, method 400 includes one or more image sensors 202a and one or more depth sensors 202b collecting the depth information and the visual information for generation of a 3D image of an object of interest. At step 402, the data analysis module 206 can receive image data from the image sensor devices 202a (such as, video in the case of surveillance image sensors). In some aspects, after image frames of the image scene are captured by the image sensors 202a, each of the image sensors 202a can generate a time stamp corresponding to each captured frame. The generated time stamps can be received by the data analysis module 206 together with the image data. A time stamp can be output as a footer, using an embedded data format, for example.

At step 404, the data analysis module 206 can receive depth information from the depth sensor devices 202b. Depth information can include a depth map. In other words, one or more depth sensors 202b can be configured to generate a depth map, i.e., an array of 3D coordinates, comprising a depth (Z) coordinate value of the objects in the scene at each point (X,Y) within a predefined area. (In the context of an array of image-related data, these (X,Y,Z) points are also referred to as voxels.) In some aspects, the data analysis module 206 can use depth maps to generate a stereo 3D representation of the environment. In one aspect, the data analysis module 206 can create a data hierarchy of 3D information of the environment captured by one or more depth sensors 202b. In other words, the data analysis module 206 can receive 3D information about the environment (image scene), e.g., as a stream of depth images. The 3D information of the environment can be processed in the voxel grid. Each voxel can contain one or more signed distance functions (SDFs) that describe whether the voxels are inside or outside the geometry of the object in the environment. Voxels can be grouped into a "brick". Each brick, for example, $8^3$ voxels, etc., can include a plurality of voxels within the cube volume. Two or more bricks can be further grouped into "tiles". Each tile can contain multiple bricks.

At step 406, as part of processing depth information, current depth maps from an image, or a plurality of related images (e.g., video, etc.), can be used to construct one or more depth estimate signatures for the image itself or objects within the image. Depth estimate signature can be derived by collecting depth values for regions in the image, possibly into a vector, an Ntuple, or other multi-valued structures. The signature can then be used to trigger one or more alerts (step 418). Further, each known object can have a depth estimate signature, which can be stored in the database of depth analytics rules 222.

At step 408, the data analysis module 206 can combine the depth information with the plurality of images of the image scene using a machine learning model. The depth information from different images can be combined to generate a 3D view of the image scene. In some cases, machine learning algorithms can be used to generate missing visual data.

At step 410, the data analysis module 206 can perform vertex triangulation. In other words, surfaces defined by the geometric objects in the image scene can be represented as a polygon model. Each polygon in the polygon model is defined by at least three vertices, and each vertex can be characterized by color and alpha values. In triangulating a two-dimensional geometric object that includes a curved path, the curve can be approximated by a series of line segments. The polygon can then be triangulated using conventional polygon triangulation techniques such as Siedel, Watson, Delaunay, etc., to produce a set of triangles.

In an aspect, at 412, the data analysis module 206 can perform interpolation of data associated with the image scene. In an aspect, the data analysis module 206 combines depth data and image data provided by the vertex triangulation (step 410) to perform the aforementioned data interpolation. Aspects of the present disclosure describe one method of interpolation of a viewpoint outside the trajectory between two frames. For instance, one way to interpolate viewpoints for locations outside of the trajectory between two frames can include moving the layers and/or control points perpendicular to the trajectory direction based on their depth. Specifically, layers/control points at greater depth are moved less than layers/control points at lesser depth. Depending on the characteristics of the frames, different methods can be chosen to provide an appropriate result In an aspect, at step 414, the data analysis module 206 can generate a 3D image of the image scene using the interpolated data. In one aspect, the data analysis module 206 can generate a 3D image of the object of interest 302 and render the image in the primary video pane 110, for example, as the object travels through the monitored area. In some cases, the user can send commands to the image sensors 202*a* to change one or more data capture parameters such as image sensor angle, focus, frame rate, etc.

At step 416, the data analysis module can analyze the generated 3D object to determine if any of alert conditions have been met. In an aspect, the data analysis module 206 uses information provided by the image analysis engine 228 (such as, confidence level or criterion for the detected object(s)) to determine if an alert should be triggered. In response to determining that an alert should not be triggered (step 416, "No" branch), the data analysis module 206 can render the 3D image of the image scene in the primary video pane 110, for example (step 420). In response to determining that a notification should be triggered (step 416, "Yes" branch), the data analysis module 206 can generate an alert and send it to the alert database 226 (step 418). In an aspect, a baggage alert can be triggered when someone leaves a bag unattended. The alert database 226 can hold records for different locations containing geographical coordinates and an associated risk level. The risk levels can also vary according to time. One example record stored in the alert database 226 could be for an office where the risk is low during the day but high if any items are left unattended. In various aspects different alerts can be triggered based on different monitoring modes, zones and areas with different risks. For example, a face recognition alert can be triggered for unrecognized person. Once the data analysis module 206 has determined that multiple potential entrants are in the vicinity of the controlled access point and one of them is not authorized, or if one person's face is not visible to an image sensor 202 that might be configured to perform facial recognition module, a face recognition alert can be triggered by the data analysis module 206.

In other words, the method 300 includes a method for enhanced 3D visualization. One aspect of the method includes receiving a plurality of images of an image scene from a plurality of image sensors. Depth information at locations of the image scene is received from a plurality of depth sensors. The depth information is combined with the plurality of images of the image scene using a machine learning model. A 3D representation of the image scene is generated based on the combined depth and image information.

In one or any combination of these aspects, from the detected depth information, a depth map is generated identifying depth discontinuities.

In one or any combination of these aspects, the generating a 3D representation of the image scene further comprises generating a polygon model of the object of interest. Each polygon in the polygon model has a plurality of vertices. The generating a 3D representation of the image scene further comprises triangulating each polygon of the polygon model using vertex triangulation.

In one or any combination of these aspects, the machine learning model performs image enhancement using an interpolation technique.

In one or any combination of these aspects, the method further includes isolating an object of interest from the image scene based on the depth information. The generating the 3D representation of the image scene includes generating the 3D representation of the object of interest.

In one or any combination of these aspects, the method further includes determining a position of the object of interest based on the combined depth and image information.

In one or any combination of these aspects, the method further includes detecting motion activities within a predefined depth range of the image scene using the machine learning model.

In one or any combination of these aspects, the method further includes analyzing the generated 3D representation of the image scene and generating a notification to indicate a detected event based on the analysis of the generated 3D representation of the image scene.

In one or any combination of these aspects, the detected event includes detection of an unrecognized person. The generated notification includes a 3D representation of a face of the unrecognized person.

In one or any combination of these aspects, the detected event includes detection of an unattended object. The generated notification includes a 3D representation of the unattended object.

Figure 5:
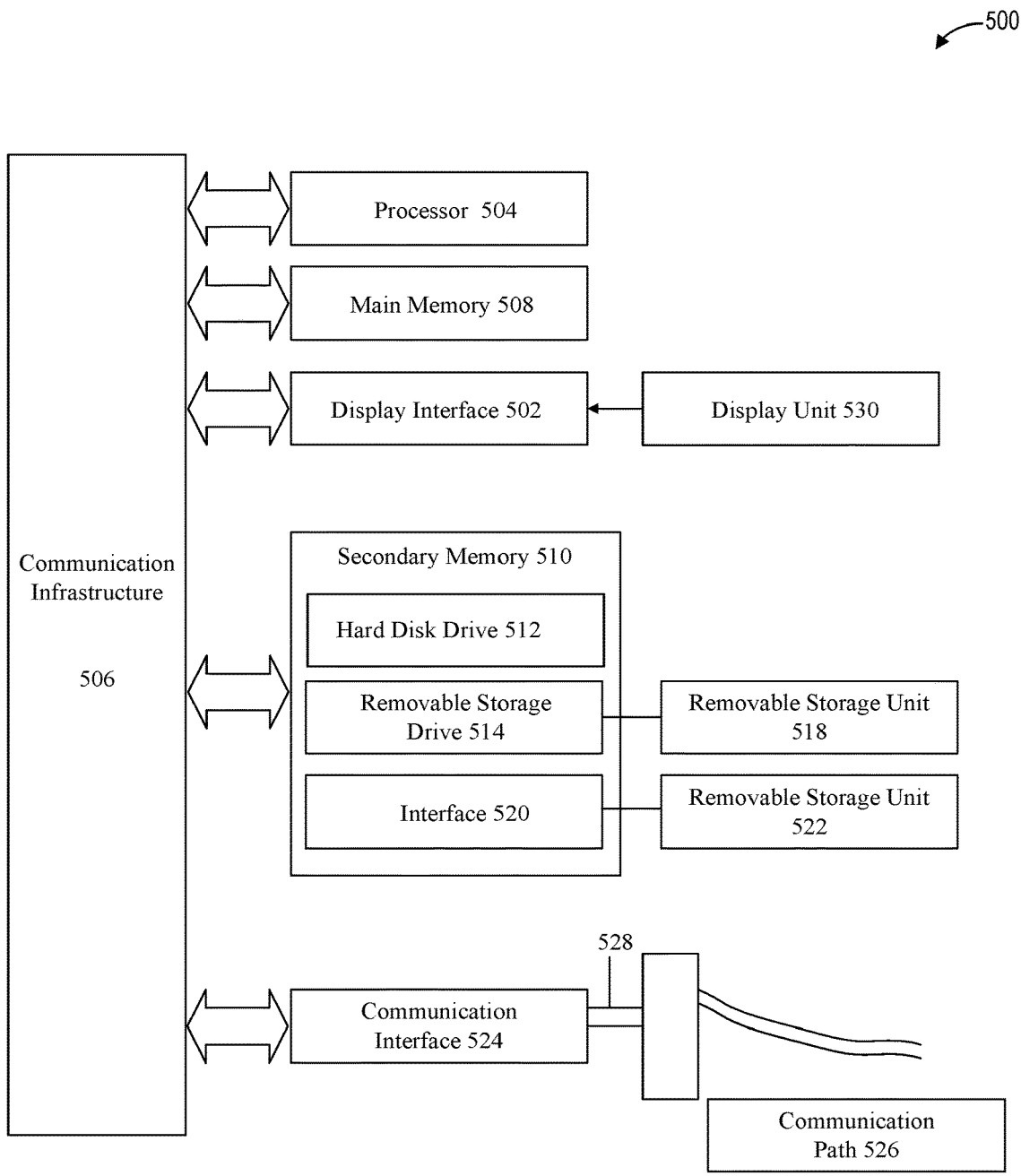
FIG. 5 is a block diagram of various hardware components and other features of a computer system that enables enhanced 3D visualization in accordance with aspects of the present disclosure.

FIG. 5 presents an example system diagram of various hardware components and other features that can be used in accordance with aspects of the present disclosure. Aspects of the present disclosure can be implemented using hardware, software, or a combination thereof and can be implemented in one or more computer systems or other processing systems. In one example variation, aspects of the disclosure are directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Processor 504, or any other "processor," as used herein, processes signals and performs general computing and arithmetic functions. Signals processed by the processor can include digital signals, data signals, computer instructions, processor instructions, messages, a bit, a bit stream, or other computing that can be received, transmitted and/or detected.

Communication infrastructure 506, such as a bus (or any other use of "bus" herein), refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a bus that interconnects components inside a access control system using protocols, such as Controller Area network (CAN), Local Interconnect Network (LIN), Wiegand and Open Supervised Device Protocol (OSDP) among others.

Further, the connection between components of computer system 500, or any other type of connection between computer-related components described herein can be referred to an operable connection, and can include a connection by which entities are operably connected, such that signals, physical communications, and/or logical communications can be sent and/or received. An operable connection can include a physical interface, a data interface and/or an electrical interface.

Computer system 500 can include a display interface 502 that forwards graphics, text, and other data from the communication infrastructure 506 (or from a frame buffer not shown) for display on a display unit 530. Computer system 500 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 can include other similar devices for allowing computer programs or other instructions to be loaded into computer system 500. Such devices can include, for example, a removable storage unit 522 and an interface 520. Examples of such can include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

It should be understood that a memory, as used herein can include volatile memory and/or non-volatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Computer system 500 can also include a communications interface 524. Communications interface 524 allows software and data to be transferred between computer system 500 and external devices. Examples of communications interface 524 can include a modem, a network interface (such as an Ethernet card), a communications port, a Personal Computer Memory Card International Association (PCMCIA) slot and card, etc. Software and data transferred via communications interface 524 are in the form of signals 528, which can be electronic, electromagnetic, optical or other signals capable of being received by communications interface 524. These signals 528 are provided to communications interface 524 via a communications path (e.g., channel) 526. This path 526 carries signals 528 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 514, a hard disk installed in hard disk drive 512, and signals 528. These computer program products provide software to the computer system 500. Aspects of the disclosure are directed to such computer program products.

Computer programs (also referred to as computer control logic) are stored in main memory 508 and/or secondary memory 510. Computer programs can also be received via communications interface 524. Such computer programs, when executed, enable the computer system 500 to perform various features in accordance with aspects of the present disclosure, as discussed herein. In particular, the computer programs, when executed, enable the processor 504 to perform such features. Accordingly, such computer programs represent controllers of the computer system 500.

In variations where aspects of the disclosure are implemented using software, the software can be stored in a computer program product and loaded into computer system 500 using removable storage drive 514, hard drive 512, or communications interface 520. The control logic (software), when executed by the processor 504, causes the processor 504 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for enhanced three dimensional (3D) visualization comprising:
receiving a plurality of frames of an image scene from a plurality of image sensors, wherein the plurality of frames includes an object of interest that is moving within the image scene;
receiving depth information at locations of the image scene from a plurality of depth sensors;
combining the depth information with the plurality of frames of the image scene using a machine learning model, wherein the machine learning model is configured to perform image enhancement using an interpolation technique, wherein the image enhancement includes using the depth information to generate artificially rendered frames of the image scene along a path between or beyond the plurality of frames; and generating a 3D representation of the object of interest moving in the image scene, based on the plurality of frames of the image scene and the artificially rendered frames of the image scene.

2. The method of claim 1, further comprising:
generating, from the depth information, a depth map identifying depth discontinuities.

3. The method of claim 1, wherein generating the 3D representation of the image scene further comprises:
generating a polygon model of the object of interest, each polygon in the polygon model having a plurality of vertices; and
triangulating each polygon of the polygon model using vertex triangulation.

4. The method of claim 1, further comprising isolating the object of interest from the image scene based on the depth information, wherein generating the 3D representation of the image scene comprises generating the 3D representation of the object of interest.

5. The method of claim 4, further comprising determining a position of the object of interest based on the combining of the depth information and the plurality of frames.

6. The method of claim 1, further comprising detecting motion activities within a predefined depth range of the image scene using the machine learning model.

7. The method of claim 1, further comprising analyzing the 3D representation of the image scene and generating a notification to indicate a detected event based on the analyzing of the 3D representation of the image scene.

8. The method of claim 7, wherein the detected event comprises detection of an unrecognized person and wherein the notification includes a 3D representation of a face of the unrecognized person.

9. The method of claim 7, wherein the detected event comprises detection of an unattended object and wherein the notification includes a 3D representation of the unattended object.

10. The method of claim 1, wherein the path follows a non-linear trajectory.

11. The method of claim 1, wherein to generate the artificially rendered frames of the image scene along the path between or beyond the plurality of frames comprises generating an artificially rendered frame of a location outside of a trajectory between two frames.

12. A system for enhanced three dimensional (3D) visualization comprising a hardware processor configured to:
receive a plurality of frames of an image scene from a plurality of image sensors, wherein the plurality of frames includes an object of interest that is moving within the image scene;
receive depth information at locations of the image scene from a plurality of depth sensors;
combine the depth information with the plurality of images frames of the image scene using a machine learning model, wherein the machine learning model is configured to perform image enhancement using an interpolation technique, wherein the image enhancement includes using the depth information to generate artificially rendered frames of the image scene along a path between or beyond the plurality of frames; and
generate a 3D representation of the object of interest moving in the image scene, based on the plurality of frames of the image scene and the artificially rendered frames of the image scene.

13. The system of claim 12, wherein the hardware processor is further configured to:
generate, from the depth information, a depth map identifying depth discontinuities.

14. The system of claim 12, wherein the hardware processor configured to generate the 3D representation of the image scene is further configured to:
generate a polygon model of the object of interest, each polygon in the polygon model having a plurality of vertices; and
triangulate each polygon of the polygon model using vertex triangulation.

15. The system of claim 12, wherein the hardware processor is further configured to isolate the object of interest from the image scene based on the depth information, and wherein the hardware processor configured to generate the 3D representation of the image scene is further configured to generate the 3D representation of the object of interest.

16. The system of claim 15, wherein the hardware processor is further configured to determine a position of the object of interest based on the hardware processor combining the depth information and the plurality of frames.

17. The system of claim 12, wherein the hardware processor is further configured to detect motion activities within a predefined depth range of the image scene using the machine learning model.

18. The system of claim 12, wherein the hardware processor is further configured to analyze the 3D representation of the image scene and to generate a notification to indicate a detected event based on an analysis of the 3D representation of the image scene.

19. The system of claim 18, wherein the detected event comprises detection of an unrecognized person and wherein the notification includes a 3D representation of a face of the unrecognized person.

20. The system of claim 18, wherein the detected event comprises detection of an unattended object and wherein the notification includes a 3D representation of the unattended object.

* * * * *